United States Patent

[11] 3,566,917

| [72] | Inventor | James C. White<br>P.O. Box 5495, Greenville, S.C. 29606 |
|---|---|---|
| [21] | Appl. No. | 785,608 |
| [22] | Filed | Dec. 20, 1968 |
| [45] | Patented | Mar. 2, 1971 |

[54] FLUID MANIFOLD
5 Claims, 5 Drawing Figs.

| [52] | U.S. Cl. | 137/608 |
|---|---|---|
| [51] | Int. Cl. | F16d 1/00 |
| [50] | Field of Search | 137/608, 484.2, 517 |

[56] References Cited
UNITED STATES PATENTS

| 2,598,961 | 6/1952 | Andrus | 137/608 |
|---|---|---|---|
| 2,936,772 | 5/1960 | Kinderman | 137/484.2X |
| 3,092,141 | 6/1963 | Stark | 137/608 |
| 3,106,226 | 10/1963 | Machen | 137/517X |
| 3,447,755 | 6/1969 | Cartwright | 137/608X |
| 3,459,221 | 8/1969 | Axelrod | 137/608 |
| 3,464,447 | 9/1969 | Jones | 137/608 |

*Primary Examiner*—Samuel Scott
*Attorney*—Newton, Hopkins & Ormsby

ABSTRACT: A fluid manifold in the form of an elongated conduit having spaced along its length a plurality of bores extending through a portion of the conduit spaced from the passageway of the conduit and substantially perpendicular thereto. Additional bores extending through the conduit and the passageway of the conduit and valve means for each of the bores to form a plurality of groups of outlets from the conduit with valves for each of the groups.

PATENTED MAR 2 1971 3,566,917
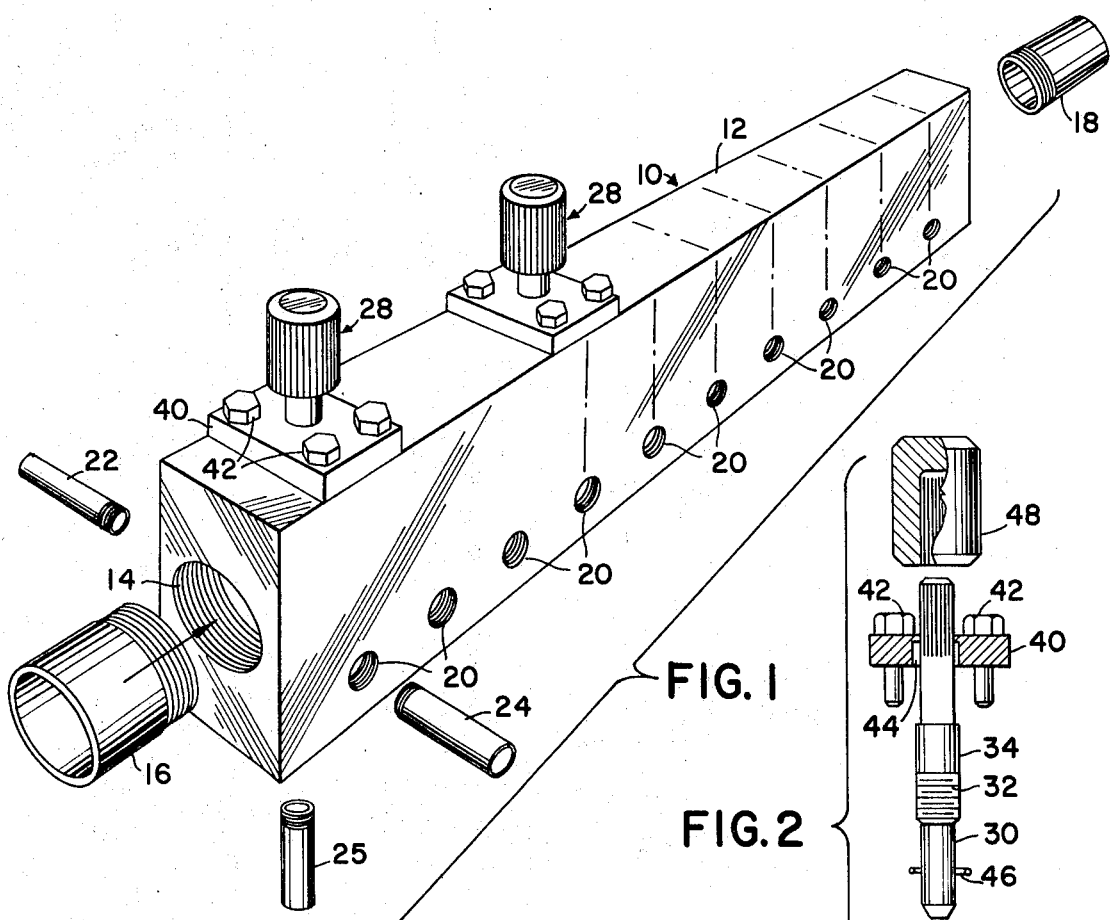
FIG. 1
FIG. 2
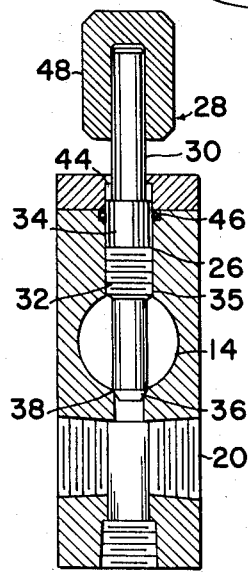
FIG. 3
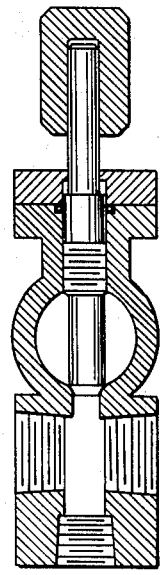
FIG. 4
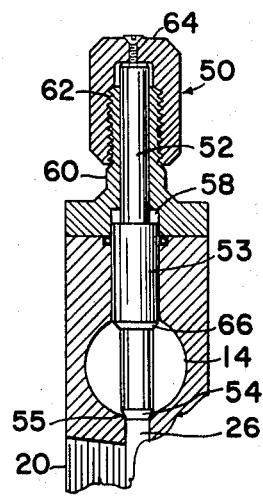
FIG. 5
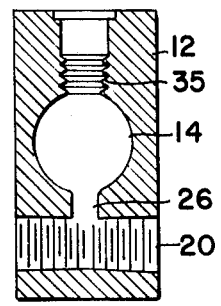
INVENTOR
JAMES C. WHITE
BY Newton, Hopkins & Ormsby
ATTORNEYS

FLUID MANIFOLD

BACKGROUND OF THE INVENTION

This invention relates to a manifold for fluids which provides a selected number of outlets and includes valve means for the outlets which may be easily installed in the manifold.

In many instances, in both domestic and industrial fluid-distributing systems for steam, liquid fuel, water, or gas, it is necessary to provide a manifold for dividing fluid flow and directing the fluid in various directions. The presently available manifolds are made in various sizes, having certain numbers of outlets to meet the varied demands of different systems. It is therefore necessary to ascertain in advance what size manifolds are needed for a particular system. Should circumstances change during the installation of the system, different sizes of manifolds may be required.

SUMMARY OF THE INVENTION

The present invention provides a fluid manifold having a plurality of outlets which may be selectively used. Also, the length of the manifold may be shortened at will on the job site by cutting off a portion of the manifold.

It is an object of this invention to provide a fluid manifold which provides a number of desired connections.

It is further an object of this invention to provide a fluid manifold with a plurality of connections which may be altered on the job site to fit the needs of the particular installment.

These and other objects of the invention will be readily apparent from the following description and the accompanying drawings.

BRIEF DESCRIPTION OF THE DRAWING

FIG. 1 is a perspective view of the manifold with associated pipes partially shown;

FIG. 2 is a partial cross-sectional view taken on line 1–1 of FIG. 1 with the valve and associated parts disassembled;

FIG. 3 is a partial cross-sectional view taken on line 1–1 of FIG. 1;

FIG. 4 is a partial cross-sectional view of a modification of the manifold; and

FIG. 5 is a partial cross-sectional view of still a further modification of the manifold.

DESCRIPTION OF THE ILLUSTRATIVE EMBODIMENT

Referring now to the drawings, a preferred embodiment of the invention will be described.

The fluid manifold 10 comprises an elongated piece of pipe 12 having a rectangular shape as illustrated. The shape of the pipe is not critical and may be varied as desired to meet the various needs of its use or manufacture.

The pipe 12 has a longitudinal passageway 14 extending throughout its length and is provided with threads at each end thereof for connection with a pipe 16 providing a source of fluid and a pipe 18 providing an exit for the fluid. If the manifold is to be the terminus of the fluid system, a plug (not shown) may be used in lieu of the pipe 18.

A plurality of bores 20 extend transversely through the pipe 12 spaced below the longitudinal passageway 14. The bores 20 are threaded throughout their length for connection with conduits 22 and 24.

A plurality of additional bores 26 extend through the pipe and through the passageway 14. Each bore 26 extends through a bore 20 and is substantially perpendicular thereto.

It will now be apparent that each bore 20 and the cooperating bore 26 form a group of openings in the manifold 10 communicating with the passageway 14.

A valve 28 is provided for each pair of bores 20 and 26 to control the flow of fluid from the passageway 14. The valve 28 includes a stem 30 having threads 32 on an enlarged portion 34 cooperating with threads 35 in the bore 26. The lower end of the stem 30, as illustrated, is tapered at 36 to form a seating surface with the junction 38 of the bore 26 with the passageway 14. A plate 40 secured to the pipe 12 by bolts 42 holds the valve in place. The plate 30 is recessed at 44 to permit limited longitudinal movement of the valve stem when it is rotated. An O-ring 46 may be provided to prevent leakage of fluid about the valve stem. A knob 48 is secured to the top of the stem 30 for operating the valve.

When the nob 48 is rotated, the valve stem 30 will move upwardly from its closed position, as shown in FIG. 3, until the enlarged portion 34 abuts the plate 40. In the open position fluid would flow from the passageway 14 into bore 30 and the lower portion of bore 26 to the conduits 22, 24, and 25.

As stated above, a plurality of valves 28 are provided so that any number of connections may be made with the manifold with valve means for controlling the flow of fluid through the various outlets. When it is desired to use only a limited number of connections with the manifold 10, the unused bores 20 and 26 are plugged with conventional means.

Also, if the length of the manifold is excessive, it may be cut off to the desired length.

A modification of the valve means is illustrated in FIG. 5. The valve 50 has a stem 52 which is provided with an enlarged portion 53 having a smooth surface and a seating surface 54 on its lower end cooperating with the junction 55 of the bore 26 with the passageway 14. The valve 50 is secured in a bore 26 by a plate 56 connected to the pipe 12 in the same manner as the plates 40.

The plate 56 is provided with a recess 58 to permit limited longitudinal movement of the valve stem 52. The plate 56 is provided with a tubular extension 60 which encircles the upper end of the valve stem 52, the tubular extension 60 having threads 62 on its external surface for threaded engagement with a cap 64.

It will be apparent from the foregoing that when the cap 64 is removed from the extension 60 the fluid in the passageway 14 acting on the surface 66 extending radially from the valve stem to the enlarged portion 53 will force the valve stem upwardly until the enlarged portion 53 abuts the plate 56. Instead of removing the cap 64 it may be unscrewed slightly to permit slight movement of the valve stem, thus controlling the amount of flow from the passageway 14.

The shape of the manifold has been illustrated as rectangular in FIG. 1; however, the shape may take various forms, one of which is shown in cross section in FIG. 4.

It will now be apparent that the present invention provides a manifold of simple and economical construction which may provide a number of connections with conduits as desired. Valve means of rugged construction are provided, which may be conveniently secured to the manifold to control the flow of fluid. One unique feature of the present invention is that the manifold may be altered to a desired length by merely cutting off a portion of the manifold.

I claim:

1. A fluid manifold comprising a length of pipe having a longitudinal passageway therethrough, a series of bores extending transversely through said pipe and forming outlets from said manifold, a second series of bores extending transversely through said pipe and connecting said first bores with said longitudinal passageway, valve means associated with each bore of said second series, each such valve means comprising a valve member reciprocally movable to close the corresponding bore, and seated at the inner end of such bore, each valve means further comprising a valve stem having a portion of relatively small diameter adjacent the valve member and a portion of larger diameter remote therefrom, said stems extending transversely across the longitudinal passageway, with the junctures between the two portions of different diameter lying within the said passageway, so that fluid in said passageway will act on the inner ends of said portions of larger diameter to urge the valve members away from their seats, a third series of transverse openings in the pipe, said openings lying opposite corresponding openings of said second series, and each such opening closely and slidably receiving the larger portion of a valve stem, and means engageable with each of said valve means for moving its valve stem toward closed position against the pressure of fluid in said longitudinal passageway.

2. A manifold as in claim 1 wherein each valve stem additionally includes a second portion of relatively small diameter at the end of the stem remote from the valve and the means for moving the valves toward closed position act upon said last-mentioned portions.

3. A manifold as in claim 2 wherein a plate is mounted on the outside of the pipe adjacent each valve stem and includes a tubular extension through which the small outer portion of the valve stem passes, and wherein a cap is threadedly engaged with said extension, said cap covering the outer end of the valve stem and adapted to engage it to move the valve to closed position or to allow it to open to a predetermined extent under the pressure of the fluid in the longitudinal passageway.

4. A manifold as in claim 1 wherein the bores of the first series extend transversely through the pipe below the longitudinal passageway and open outwardly of the manifold at each of their ends, and wherein the passages of the second series open into the mid portions of the corresponding passages of the second series.

5. A manifold as in claim 4 wherein the valve members seat downwardly on the inner ends of the passages of the second series, so that they will close by gravity and prevent leakage when fluid pressure in the manifold is shut off.